(12) United States Patent
Nho et al.

(10) Patent No.: US 9,057,941 B2
(45) Date of Patent: Jun. 16, 2015

(54) REFLECTION TYPE SCREEN FOR FRONT PROJECTION DISPLAY APPARATUS

(71) Applicant: SAMSUNG ELECTRONICS CO., LTD., Suwon-si (KR)

(72) Inventors: Jeong-ho Nho, Suwon-si (KR); Sung-tae Kim, Seoul (KR); Sang-hyun Sohn, Suwon-si (KR); Won-yong Lee, Suwon-si (KR); Yong-Dok Cha, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/085,084

(22) Filed: Nov. 20, 2013

(65) Prior Publication Data
US 2014/0139914 A1 May 22, 2014

(30) Foreign Application Priority Data
Nov. 20, 2012 (KR) .................. 10-2012-0131800

(51) Int. Cl.
*G03B 21/56* (2006.01)
*G03B 21/60* (2014.01)
*G02B 5/02* (2006.01)

(52) U.S. Cl.
CPC .............. *G03B 21/60* (2013.01); *G03B 21/56* (2013.01); *G02B 5/0278* (2013.01)

(58) Field of Classification Search
CPC ....... G03B 21/60; G03B 21/56; G02B 5/0278
USPC .......................................... 359/449, 459, 452
See application file for complete search history.

(56) References Cited

U.S. PATENT DOCUMENTS

| 3,893,748 | A  | * | 7/1975  | De Palma et al. ............. 359/455 |
| 4,206,969 | A  | * | 6/1980  | Cobb et al. .................... 359/452 |
| 4,509,823 | A  | * | 4/1985  | Moriguchi et al. ........... 359/457 |
| 4,911,529 | A  | * | 3/1990  | Van De Ven ................. 359/454 |
| 6,023,369 | A  | * | 2/2000  | Goto ............................ 359/443 |
| 6,324,011 | B1 | * | 11/2001 | Higuchi ....................... 359/627 |
| 6,417,966 | B1 | * | 7/2002  | Moshrefzadeh et al. ..... 359/453 |
| 6,710,919 | B1 | * | 3/2004  | Clausen ....................... 359/453 |
| 6,842,282 | B2 | * | 1/2005  | Kuroda et al. ............... 359/449 |
| 7,443,583 | B2 | * | 10/2008 | Yamauchi .................... 359/454 |
| 7,649,687 | B2 | * | 1/2010  | Shimoda et al. ............. 359/449 |
| 2002/0163719 | A1 | * | 11/2002 | Ma et al. ..................... 359/443 |
| 2005/0207007 | A1 | * | 9/2005 | Shimoda et al. ............. 359/449 |
| 2007/0153376 | A1 | * | 7/2007 | Choi ............................ 359/459 |
| 2008/0297895 | A1 | * | 12/2008 | Fujita et al. .................. 359/459 |
| 2008/0304150 | A1 | * | 12/2008 | Yamauchi .................... 359/459 |
| 2014/0092471 | A1 | * | 4/2014 | Sadahiro et al. ............. 359/449 |

FOREIGN PATENT DOCUMENTS

| JP | 5165415 A | 7/1993 |
| JP | 200167006 A | 3/2001 |
| JP | 2006309956 A | 11/2006 |
| JP | 2009222996 A | 10/2009 |

* cited by examiner

*Primary Examiner* — Christ Mahoney
(74) *Attorney, Agent, or Firm* — Sughrue Mion, PLLC

(57) ABSTRACT

Provided is a front reflection screen for a front projection display apparatus. The front reflection screen includes a reflection layer configured to reflect an incident light including an image light projected from a projector and an external light, and a tint layer disposed before the reflection layer and including light absorbing particles to block a portion of the incident light.

6 Claims, 11 Drawing Sheets
(2 of 11 Drawing Sheet(s) Filed in Color)

REFLECTION TYPE SCREEN FOR FRONT PROJECTION DISPLAY APPARATUS

CROSS-REFERENCE TO RELATED APPLICATION

This application claims priority from Korean Patent Application No. 10-2012-0131800, filed on Nov. 20, 2012 in the Korean Intellectual Property Office, the disclosure of which is incorporated herein in its entirety by reference.

BACKGROUND

1. Field

Apparatuses consistent with exemplary embodiments relate to a reflection type screen for front projection display apparatus, and more particularly to a reflection type screen for a short throw ratio front projection display apparatus.

2. Description of the Related Art

In the related art, a front projection display apparatus includes a reflection type screen that displays an image, and a projector disposed in front of the screen that projects the image to the screen.

Since the front projection display apparatus uses a reflection type screen, the front projection display apparatus has an advantage of increasing brightness of an image. However, if the front projection display apparatus is used in a bright room condition, the front projection display apparatus has a downside of providing decreased contrast of an image due to the external light.

A short throw ratio projection display apparatus, which has a very short distance between a projector and a reflection type screen, may include another downside of decreased brightness uniformity, compared to the related art projection display apparatuses. For example, brightness at a lower part of a screen of the display apparatus may be relatively high, whereas brightness at an upper part of the screen may be relatively low.

SUMMARY

One or more exemplary embodiments provide a reflection screen for a front projection display apparatus in which the contrast and/or brightness uniformity is improved, compared to the related art display apparatus.

According to an aspect of an exemplary embodiment, there is provided a front reflection screen for a front projection display apparatus, the screen including: a reflection layer configured to reflect an incident light including an image light projected from a projector and an external light, and a tint layer disposed before the reflection layer and including light absorbing particles to block a portion of the incident light.

The tint layer may include a plurality of tint portions having the light absorbing particles, and a plurality of light transmission portions having light transmission material. The plurality of tint portions and the plurality of light transmission portions may be laminated to alternate with each other, and each of the plurality of tint portions and each of the plurality of light transmission portions may extend from the reflective layer at an incline with respect to a direction of the image light reflected from the reflection layer.

The plurality of tint portions and the plurality of light transmission portions may alternate with each other in a direction perpendicular to the direction of the image light reflected from the reflection layer.

The each of the plurality of tint portions and the each of the plurality of light transmission portions may extend downward with respect to a direction of the image light reflected from the reflection layer.

The tint layer may cover the reflection layer, the reflection layer may include a plurality of reflection protrusions protruding toward the projector, and a protrusion length of each of the plurality of reflection protrusions may increase from a lower portion of the screen toward an upper portion of the screen.

Each of the plurality of reflection protrusions may have a reflection surface, each reflection surface having an inclined surface, and an angle of the inclined surface of the reflection surfaces of the reflection protrusions may increase from the lower portion of the screen toward the upper portion of the screen.

Each of the reflection surfaces may include a reflective material coating.

The front reflection screen may further include a diffusion layer provided on the tint layer to cover the tint layer.

A thickness of the tint layer may increase from an upper portion of the screen toward a lower portion of the screen.

The concentration of the light absorbing particles of the tint layer may increase from an upper portion of the screen toward a lower portion of the screen.

The front reflection screen may further include an anisotropic diffusion layer provided the reflection layer and configured to diffuse the image light reflected from the reflection layer in more a horizontal direction than in a vertical direction.

The anisotropic diffusion layer may be disposed between the tint layer and the reflection layer.

The anisotropic diffusion layer may comprise micro rod particles which diffuse the image light reflected from the reflection layer.

The micro rod particles may be arranged in a vertical direction.

The micro rod particles may be arranged inclinedly with respect to a vertical direction.

The front reflection screen may further include an isotropic diffusion layer provided on the reflection layer and configured to diffuse the image light reflected from the reflection layer isotropically.

The isotropic diffusion layer may be disposed between the anisotropic diffusion layer and the reflection layer.

The isotropic diffusion layer may comprise spherical particles to diffuse the image light reflected from the reflection layer.

The reflection layer may include a Fresnel type reflection layer.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and/or other aspects will become apparent and more readily appreciated from the following description of exemplary embodiments, taken in conjunction with the accompanying drawings of which.

DETAILED DESCRIPTION

Figure 1:
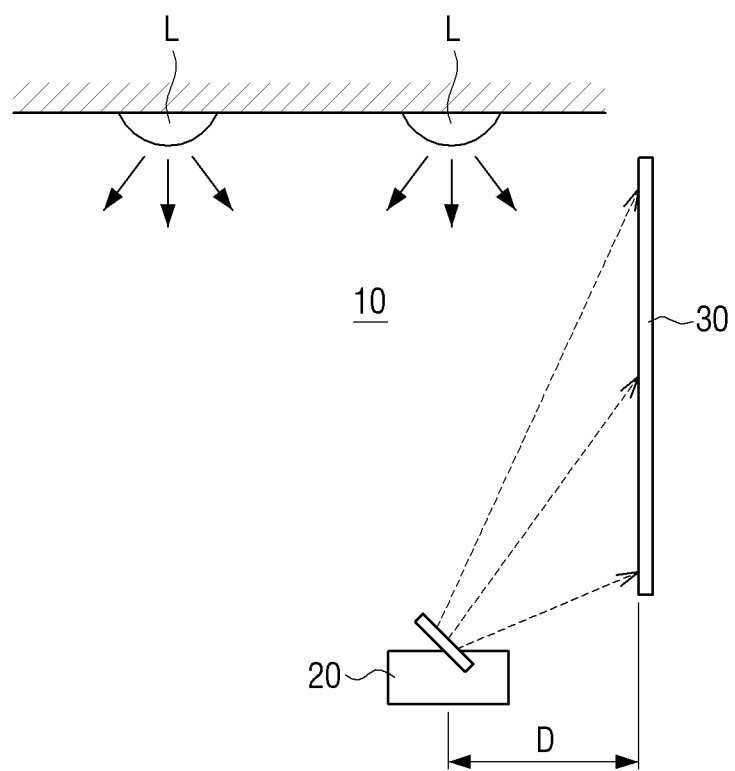
FIG. 1 is a schematic diagram of a front projection display apparatus according to an exemplary embodiment.

Reference will now be made in detail to exemplary embodiments, examples of which are illustrated in the accompanying drawings, wherein like reference numerals refer to the like elements throughout. The exemplary embodiments are described below in order to explain the present general inventive concept by referring to the figures.

FIG. 1 is a schematic diagram of a front projection display apparatus according to an exemplary embodiment.

Referring to FIG. 1, a front projection display apparatus 10 according to an exemplary embodiment comprises a projector 20 which provides an image, and a reflection type screen 30 which displays the image provided by the projector 20.

The projector 20 is arranged at a lower side and in front of the reflection type screen 30 to project an image (moving image or still image) to the screen 30.

The projector 20 is a short throw ratio projector, which is arranged very close to the reflection type screen 30, compared to projectors of the related art. That is, a distance D between the projector 20 and the reflection type screen 30 is very short. A front projection display apparatus 10 may be called a short throw ratio front projection display apparatus because the front projection display apparatus 10 employs the short throw ratio projector as the projector 20.

The reflection type screen 30 reflects an image provided by the projector 20 to the front so that the image is displayed.

If the front projection display apparatus 10 is used in a bright room condition, not only an image light but also an external light, for example provided by a brightness lamp L, may be incident to the reflection type screen 30. Such external light operates to increase the black level of the screen 30, and thus the contrast of an image may be decreased. In addition, if a short throw ratio front projection display apparatus is used as in the present exemplary embodiment, the external light may also act to cause decrease in uniformity of the black level. For example, due to the external light, a black level may be higher at the lower portion of the reflection type screen 30 than the upper portion thereof.

A front projection display apparatus 10 of the current exemplary embodiment is a short throw ratio projection display apparatus, and thus the uniformity of an image light may be decreased, compared to projection display apparatuses of the related art. For example, brightness of an image may be higher at the lower portion of the screen 30 than the upper portion thereof.

Detailed embodiments of a reflection type screen 30 will be explained below to resolve the aforementioned problems that may occur in a short throw ratio front projection apparatus.

Figure 2:
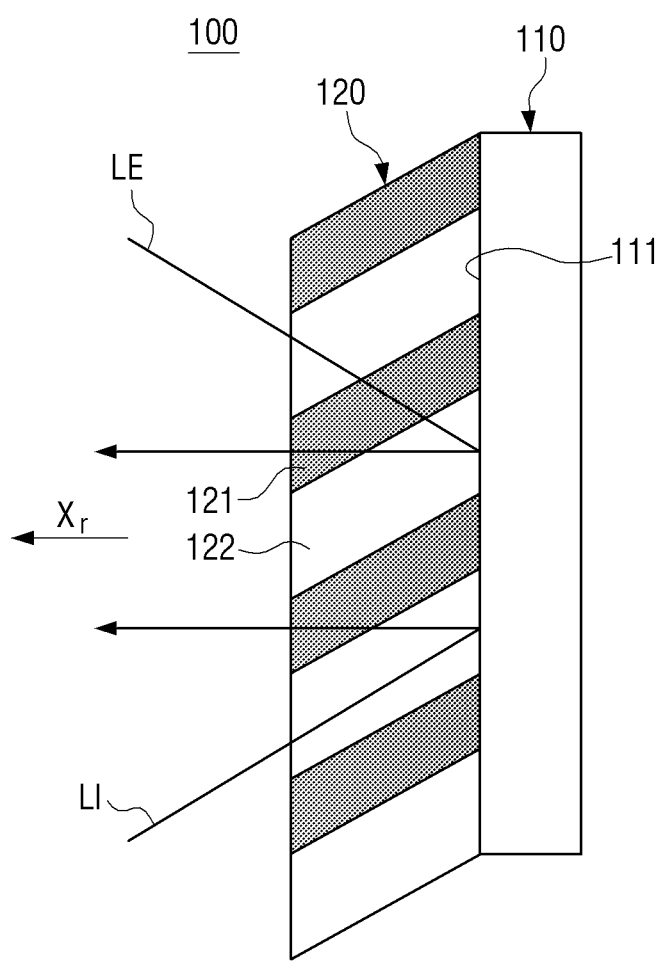
FIG. 2 is a sectional view of a reflection type screen of the front projection display apparatus in FIG. 1 according to a first exemplary embodiment.

FIG. 2 is a sectional view of a reflection type screen 100 of the front projection display apparatus 10 in FIG. 1 according to a first exemplary embodiment.

Referring to FIG. 2, a reflection type screen 100 according to the first exemplary embodiment comprises a reflection layer 110 and a tint layer 120.

The reflection layer 110 reflects an image light being incident from a projector 20 (see FIG. 1) toward the front. The front of the reflection layer 110 may be coated with a reflective material, for example, silver or aluminum, to reflect the incident image light.

The tint layer 120 is disposed in front of the reflection layer 110 to cover the reflection layer 110. In the current exemplary embodiment, the tint layer 120 is provided on the front surface 111 of the reflection layer 110, but in an alternative embodiment, a diffusion layer may be further provided between the tint layer 120 and the reflection layer 110 to increase a viewing angle.

The tint layer 120 comprises a plurality of tint portions 121 and a plurality of light transmission portions 122, and the plurality of tint portions 121 and the plurality of light transmission portions 122 are laminated in such a manner that the tint portion 121 and the light transmission portion 122 alternate with each other in an extending direction of the reflection type screen 30 as shown in FIG. 2.

The tint portions 121 are made of polymer resin in which light absorbing particles for blocking external light are dispersed. Here, the light absorbing particles may be made of black dye, and perform a function of blocking an external light being incident to a screen 100 so as to contribute to an increase of contrast of an image. The light transmission portions 122 are made of transparent polymer resin that has no light absorbing particles.

Each of the tint portions 121 and each of the light transmission portions 122 are arranged inclinedly with respect to a reflected direction X, of an image light reflected from the reflection layer 110. Preferably, the inclination direction of the tint portion 121 and the light transmission portion 122 is approximately parallel with a direction of the image light LI being incident to the tint layer 120 disposed on the screen 110. In other words, the tint portion 121 and the light transmission portion 122 are preferably arranged to be directed toward the projector 20 projecting an image light LI.

Accordingly, as illustrated in FIG. 2, the external light LE passes through the tint layer 121 at least once before the external light LE reaches the reflection layer 110 and also at least once after the external light LE is reflected by the reflection layer 110, whereas an image light LI passes the tint portion 121 only once after the image light LI is reflected by the reflection layer 110. In other words, the external light LE incident toward a screen 110 passes through the tint portion 121 at least twice before being reflected by the reflection layer 110 and then heads toward viewers, whereas the image light LI passes the tint portion 121 only once before being reflected by the reflection layer 110 and then heads toward viewers.

Therefore, the tint layer 120 of the exemplary embodiment has a characteristic to block an external light LE more than an image light LI. Thus, it is possible to minimize an image light loss due to a tint layer 120 while highly maintaining a performance of blocking an external light LE with the tint layer 120.

Accordingly, contrast of the displayed image can be improved, compared to tint layers of the related art.

Figure 3:
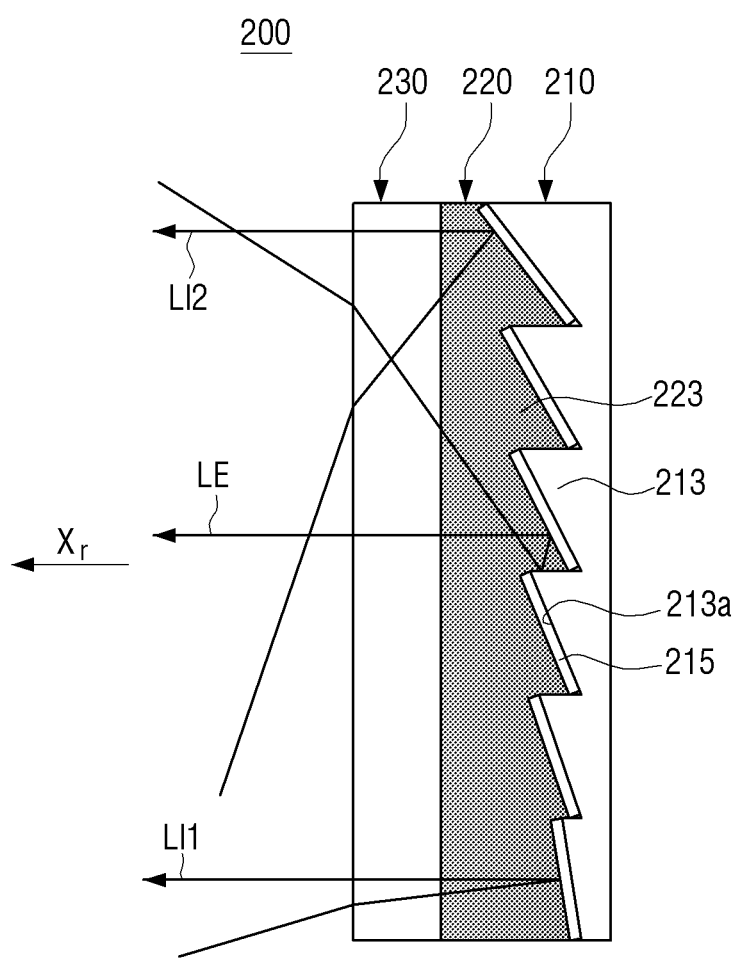
FIG. 3 is a sectional view of a reflection type screen of the front projection display apparatus in FIG. 1 according to a second exemplary embodiment.
Figure 4:
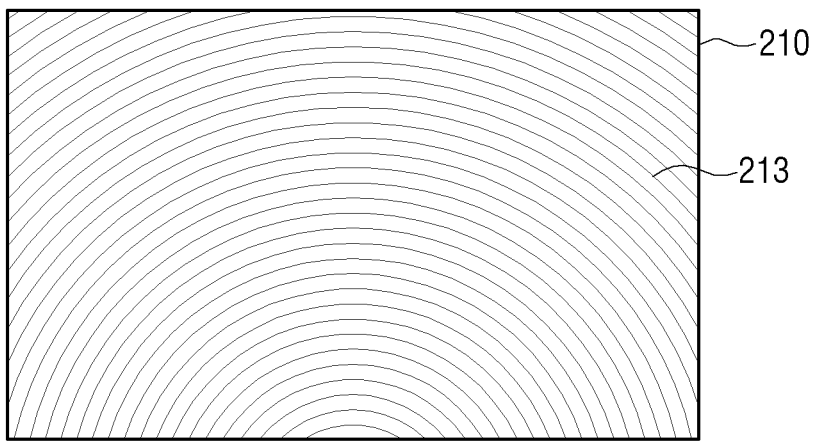
FIG. 4 is a front view of a Fresnel type of reflection layer of the reflection type screen in FIG. 3.

FIG. 3 is a sectional view of a reflection type screen 200 of the front projection display apparatus 10 in FIG. 1 according to a second exemplary embodiment. FIG. 4 is a front view of a Fresnel type of the reflection layer 210 of the reflection type screen 200 in FIG. 3.

Referring to FIG. 3, the reflection type screen 200 according to the second exemplary embodiment includes the reflection layer 210, a tint layer 220 and a diffusion layer 230.

The reflection layer 210 reflects a first and second image light LI1 and LI2 incident from a projector 20 toward the front. As illustrated in FIGS. 3 and 4, the front surface of the reflection layer 210 comprises a plurality of reflection protrusions 213 which are arranged along concentric circles and protrude toward the front. Such a reflection layer 210 having a plurality of reflection protrusions 213 is also known as a Fresnel type reflection layer.

As illustrated in FIG. 3, the reflection protrusions 213 disposed in the upper portion of the screen 200 protrude more towards the front than the reflection protrusions 213 disposed in the lower portion of the screen 200. Each of the reflection protrusions 213 has a reflection surface 213a which is inclinedly arranged with respect to a direction perpendicular to a reflected direction X, of a first and second image light LI1 and LI2 reflected from the reflection layer 210, and the inclination angles of the reflection surfaces 213a of the reflection protrusions 213 are gradually increased toward the upper portion of the screen 200 from the lower portion of the screen 200. On the reflection surface 213a, a reflective coating 215, for example with silver or aluminum, may be applied.

The tint layer 220 performs a function of blocking an external light LE incident to a screen 200, and the tint layer 220 comprises light absorbing particles which are made of black dye for such purpose.

The tint layer 220 is arranged to directly cover the reflection layer 210, and thus the tint layer 220 includes protrusions 223 in the form of wedges corresponding to the reflection protrusions 213 of the reflection layer 210.

The diffusion layer 230 is disposed in front of the tint layer 220 so as to cover the tint layer 220. The diffusion layer diffuses an image light reflected from the reflection layer 210 to widen a viewing angle of an image.

Referring to FIG. 3, a distance of a path in which a first image light LI1 incident to the lower portion of the screen 200 passes a tint layer 220 is greater than a distance of a path in which a second image light LI2 incident to the upper portion of the screen 200 passes the tint layer 220. A greater distance of a path of light passing through a tint layer 220 results in a greater light amount absorbed in the tint layer 200, and thus an amount of an image light absorbed in the tint layer 220 is larger at the lower portion of the screen 200 than at the upper portion of the screen 200.

In the related art, an ultimate short throw ratio projection display apparatus displays non-uniformity in which higher brightness is shown at the lower portion of the screen than at the upper portion of the screen. In the current exemplary embodiment, since an amount of an image light absorbed in the tint layer 200 is larger at the lower portion of the screen 200 than at the upper portion of the screen 200, the uniformity of brightness can be improved.

Referring back to FIG. 3, an external light LE incident to the screen 200 has a greater distance of a path passing the tint layer 220 compared to the first and second image lights LI1, LI2. From this, it can be understood that the tint layer 220 absorbs more an external light LE than the first and second image lights LI1, LI2. Therefore, contrast of an image can also be improved.

Figure 5:
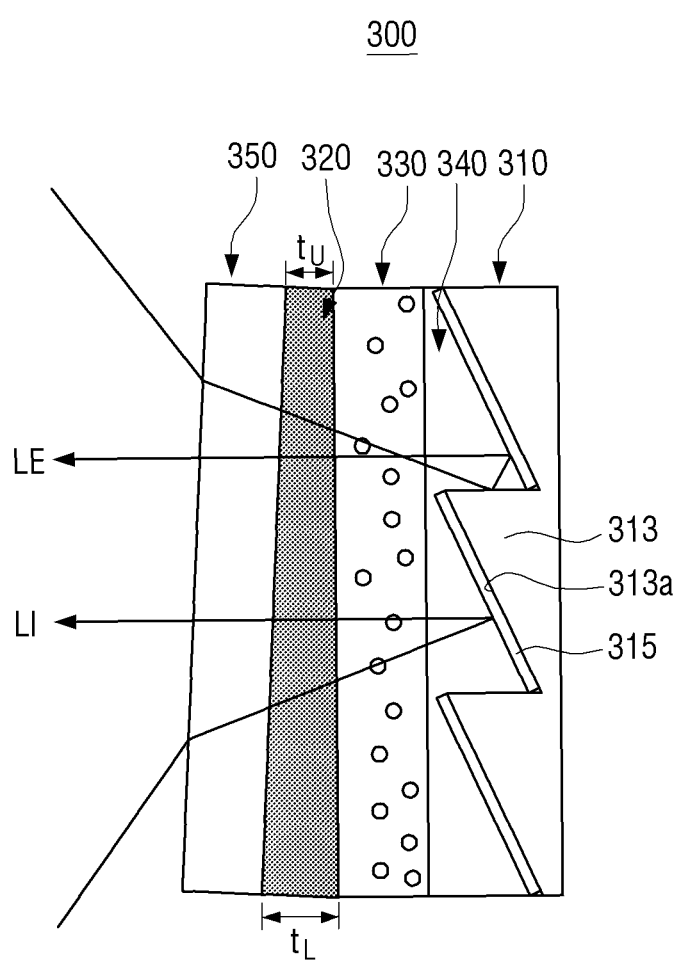
FIG. 5 is a sectional view of a reflection type screen of the front projection display apparatus in FIG. 1 according to a third exemplary embodiment.

FIG. 5 is a sectional view of a reflection type screen 300 of the front projection display apparatus 10 in FIG. 1 according to a third exemplary embodiment.

Referring to FIG. 5, the reflection type screen 300 according to the third exemplary embodiment includes a reflection layer 310, a tint layer 320, a diffusion layer 330, a light transmission layer 340 and a protection layer 350.

The reflection layer 310 reflects an image light being incident from a projector 20 toward the front. In the current exemplary embodiment, the reflection layer 310 is of a Fresnel type, and thus the reflection layer 310 includes a plurality of reflection protrusions 313, each protrusion having an inclined reflection surface 313a, and the reflection surfaces 313a of the reflection protrusions 313 are coated with a reflective material, for example, silver or aluminum, to reflect an image light.

The tint layer 320 blocks an external light incident to the screen 300. The tint layer 320 includes a plurality of light absorbing particles which are made of black dye. The tint layer 320 is disposed between the diffusion layer 330 and the protection layer 350.

The diffusion layer 330 diffuses an image light reflected from the reflection layer 310 to increase a viewing angle of the screen 300. The diffusion layer 330 is disposed between the tint layer 320 and the light transmission layer 340.

The light transmission layer 340 is disposed between the reflection layer 310 and the diffusion layer 330 and is made of a transparent material (e.g. UV resin) so as to transmit an image light.

The protection layer 350, which protects the other layers of the screen 300, is disposed in front of the tint layer 320 and is made of a polymer resin (e.g. UV resin).

As illustrated in FIG. 5, a thickness $t_L$ of the tint layer 320 is larger at the lower portion of the screen 300 than a thickness $t_U$ at the upper portion of the screen 300. From this, an amount of an image light LI absorbed in the tint layer 320 is more at the lower portion of the screen 300 than at the upper portion of the screen 300, and an amount of an external light LE absorbed in the tint layer 320 is more at the lower portion of the screen 300 than at the upper portion of the screen 300.

In general, in the case of an ultimate short throw ratio projection display apparatus, not only brightness of an image but also the black level are higher at the lower portion of the screen than at the upper portion of the screen. This phenomenon causes t decrease in uniformity of brightness. In the current exemplary embodiment, however, both an amount of an image light LI absorbed in the tint layer 320 and an amount of an external light LE absorbed in the tint layer 320 are larger at the lower portion of the screen 300 than at the lower portion of the screen 300, thus the uniformity of brightness can be improved, compared to screens of the related art.

Figure 6A:
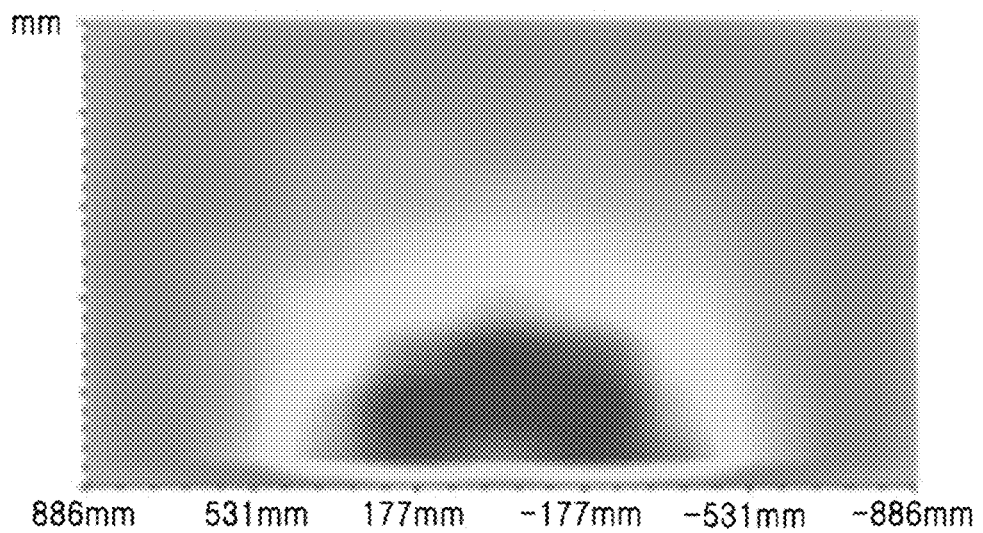
FIGS. 6A and 6B illustrate brightness photos corresponding to an image light and an external light obtained by photographing a reflection type screen of the related art.
Figure 6B:
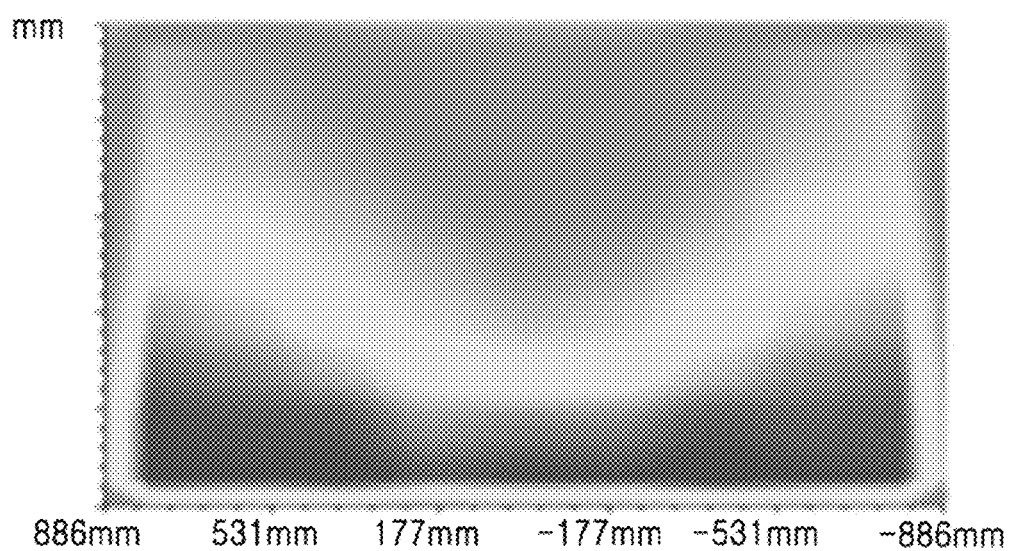

To compare the brightness uniformity of a reflection type screen of the related art and that of a reflection type screen 300 according to a third exemplary embodiment, brightness photos were taken with respect to the reflection type screen of the related art and the reflection type screen 300 according to the third exemplary embodiment. FIGS. 6A and 6B illustrate brightness photos corresponding to an image light and an external light obtained by photographing a reflection type screen of the related art, and FIGS. 7A and 7B illustrate brightness photos corresponding to an image light and an external light obtained by photographing the reflection type screen 300.

In the case of the reflection type screen of the related art as illustrated in the photo of FIG. 6A, the brightness of an image is considerably larger at the lower portion of the screen than at the upper portion of the screen, and, as illustrated in the photo of FIG. 6B, the black level is remarkably larger at the lower portion of the screen than at the upper portion of the screen.

Figure 7A:
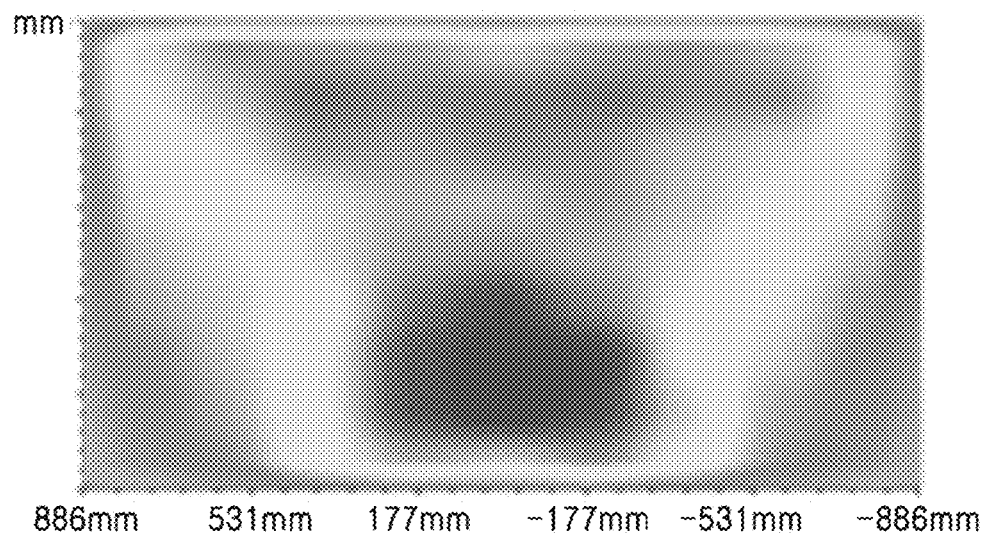
FIGS. 7A and 7B illustrate brightness photos corresponding to an image light and an external light obtained by photographing a reflection type screen according to the exemplary embodiment of FIG. 5.
Figure 7B:
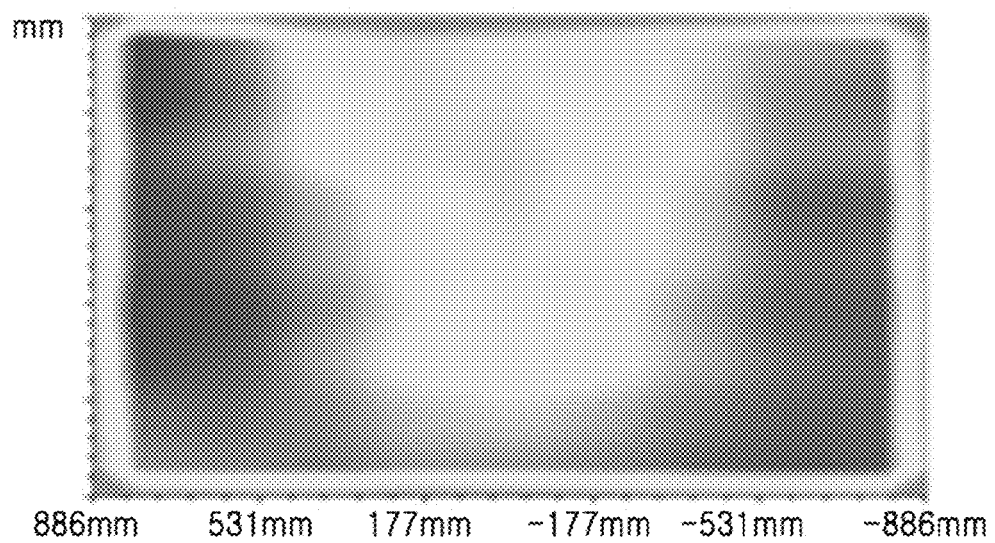

To the contrary, in the case of the reflection type screen 300 according to the third exemplary embodiment, the uniformity of brightness of an image light is improved, compared to the reflection type screen of the related art, as illustrated in the photo of FIG. 7A, and the uniformity of the black level is also improved, compared to the reflection type screen of the related art, as illustrated in the photo of FIG. 7B.

Accordingly, the reflection type screen 300 according to the third exemplary embodiment has an improved contrast of an image, compared a reflection type screen of the related art.

Figure 8:
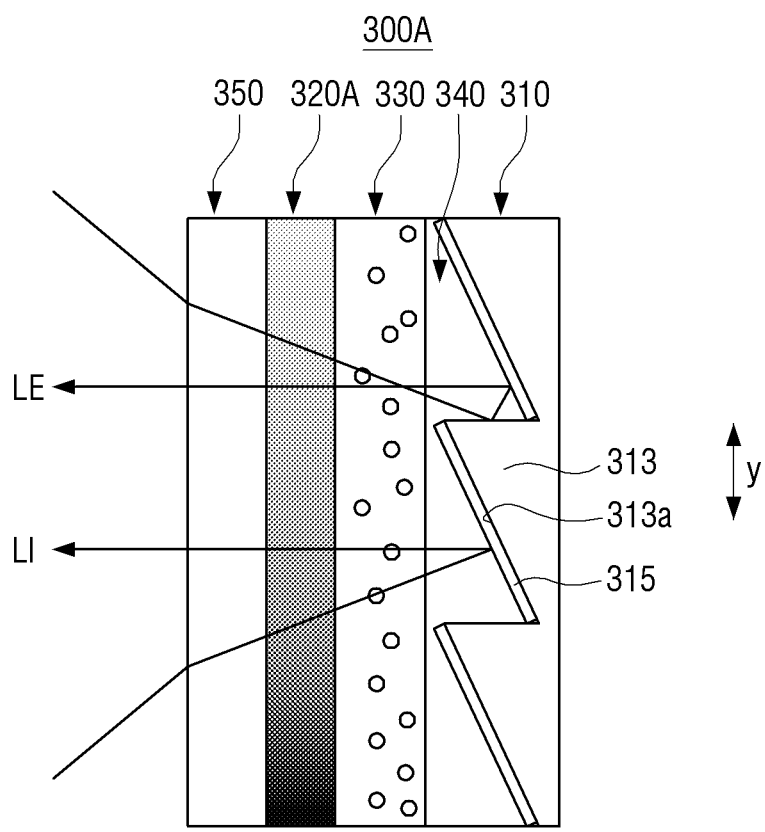
FIG. 8 is a sectional view of an alternative exemplary embodiment of the reflection type screen in FIG. 5.

FIG. 8 is a sectional view of an alternative embodiment of the reflection type screen 300 in FIG. 5.

The reflection type screen 300A in FIG. 8 has almost the same structure as the aforementioned reflection type screen 300 in FIG. 5.

A difference exists between the tint layer 320A of the reflection type screen 300A in FIG. 8 and the tint layer 320 of the reflection type screen 300 in FIG. 5. In detail, the tint layer 320A of the reflection type screen 300A in FIG. 8 has a uniform thickness as a whole, but concentration of light absorbing particles of the tint layer 320A gradually increases toward the lower portion of the screen 300A.

Due to the above concentration distribution of the light absorbing particles, both an amount of an image light LI absorbed in the tint layer 320A and an amount of an external light LE absorbed in the tint layer 320A increase toward the lower portion of the screen 300A. Accordingly, in the same manner as the aforementioned screen 300, the reflection type screen 300A may have an improved uniformity of an image, compared to screens of the related art.

Figure 9:
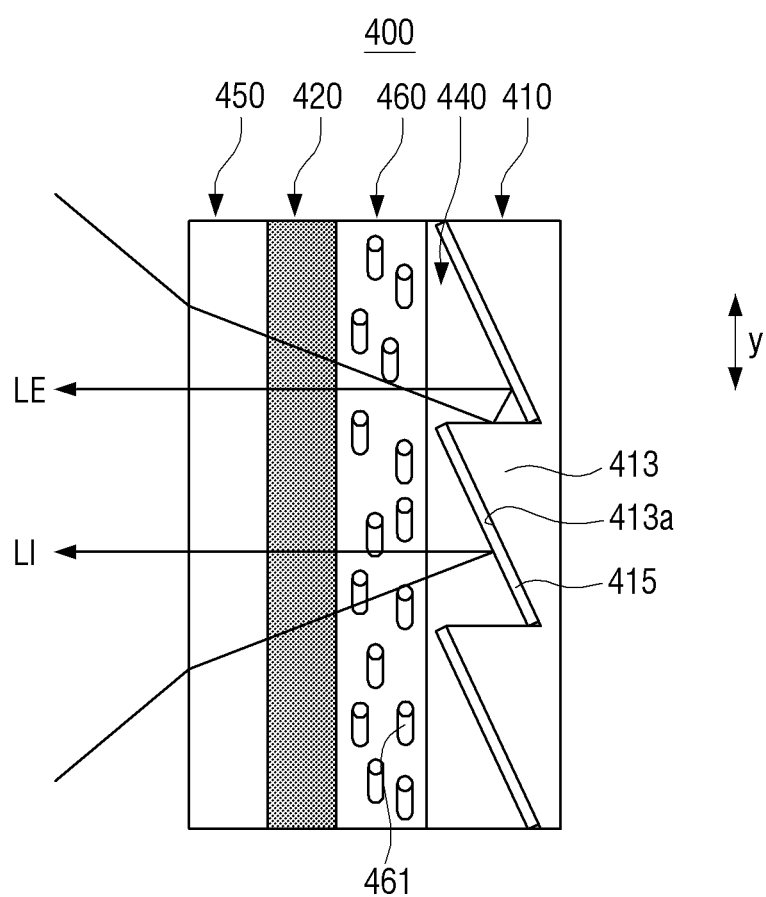
FIG. 9 is a sectional view of a reflection type screen of the projection display apparatus in FIG. 1 according to a fourth exemplary embodiment.

FIG. 9 is a sectional view of a reflection type screen 400 of the projection display apparatus 10 in FIG. 1 according to a fourth exemplary embodiment.

Referring to FIG. 9, the reflection type screen 400 according to the fourth exemplary embodiment includes a reflection layer 410, a tint layer 420, a light transmission layer 440, a protection layer 450 and an anisotropic diffusion layer 460.

The reflection layer 410 reflects an image light being incident from a projector 20 toward the front of the screen 400. In the current exemplary embodiment, the reflection layer 410 is of a Fresnel type, and thus the reflection layer 410 includes a plurality of reflection protrusions 413, each of the plurality of reflection protrusions having inclined reflection surface 413a, and each of the reflection surfaces 413a is coated with a reflective material, for example, Au or Al, to reflect an image light LI.

The tint layer 420 is disposed between the anisotropic diffusion layer 460 and the protection layer 450 to block an external light LE incident to the screen 400. Due to the tint layer 420, the external light LE incident to the screen 400 can be blocked at least in part. The tint layer 420 includes light absorbing particles for blocking light, and the light absorbing particles may be made of black dye.

The light transmission layer 440 is disposed between the anisotropic diffusion layer 460 and the reflection layer 410 and is made of transparent material (e.g. UV resin) so as to directly transmit an image light LI.

The protection layer 450, which protects the screen 400, is disposed in front of the tint layer 420 and made of transparent polymer resin (e.g. UV resin).

The anisotropic diffusion layer 460 diffuses an image light LI reflected from the reflection layer 410 to increase a viewing angle of the screen 400. To this end, the anisotropic diffusion layer 460 includes micro rod particles 461 which diffuse the reflected image light.

The micro rod particle 461 has a long cylindrical shape with an axis joining a center of each base extending in a horizontal direction and the micro rod particles 461 are arranged in a vertical direction Y (up and down direction) as illustrated in FIG. 9. Due to this shape, the micro rod particle 461 has greater diffusivity in the horizontal direction than in the vertical direction Y.

By employing the micro rod particles 461, the anisotropic diffusion layer 460 increases a horizontal viewing angle, compared to a vertical viewing angle. Since the anisotropic diffusion layer 460 increases the horizontal viewing angle, compared to the vertical viewing angle, the disadvantage of decreasing contrast in a bright room condition due to increase of a viewing angle by the diffusion layer can be minimized.

In the current exemplary embodiment, the micro rod particles 461 are exemplified as a cylindrical shape, but in another alternative embodiment, the micro rod particles 461 may have other long rotor shapes. For example, the micro rod particles 461 may have a rugby ball shape.

Figure 10:
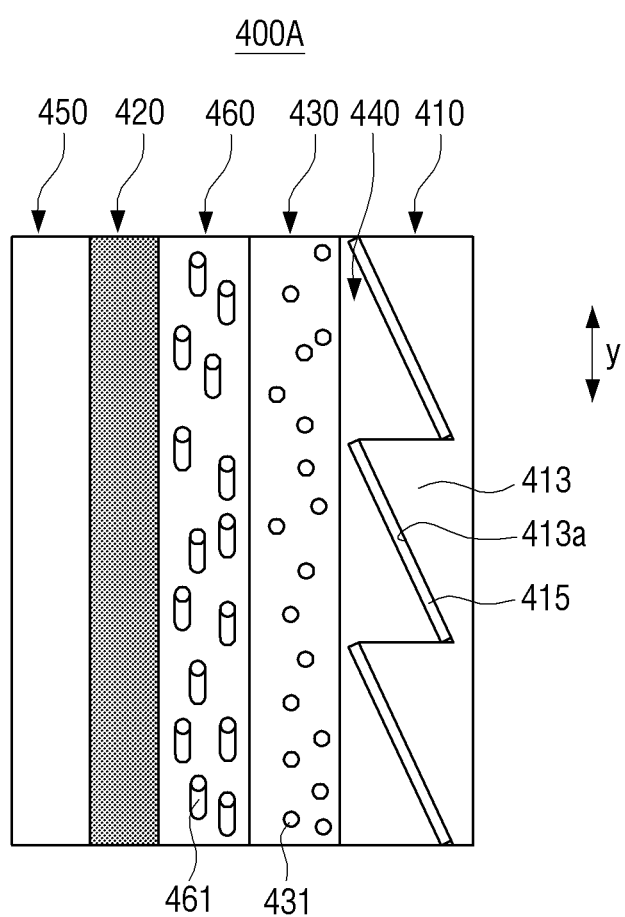
FIG. 10 is a sectional view of an alternative embodiment of the reflection type screen in FIG. 9.

FIG. 10 is a sectional view of an alternative embodiment of the reflection type screen 400 in FIG. 9.

Referring to FIG. 10, the reflection type screen 400A according to an alternative embodiment has almost the same structure as the aforementioned reflection type screen 400 in FIG. 9. However, the reflection type screen 400A is distinctive from the reflection type screen 400 in that the reflection type screen 400A further includes an isotropic diffusion layer 430 between an anisotropic diffusion layer 460 and a light transmission layer 440.

The isotropic diffusion layer 430 isotropically diffuses an image light reflected from the reflection layer 410. To this end, the isotropic diffusion layer 430 includes spherical particles 431 as diffusion particles.

If an anisotropic diffusion layer 460 is provided as the reflection type screen 400 in FIG. 9 without the isotropic diffusion layer 430, there may be a disadvantage that a vertical viewing angle is excessively narrow. However, in the case of the reflection type screen 400A as shown in FIG. 10, due to having an isotropic diffusion layer 430 as well as an anisotropic diffusion layer 460, the above disadvantage can be resolved.

In the case of the reflection type screen 400A in FIG. 10, an anisotropic diffusion layer 460 is disposed in front of the isotropic diffusion layer 430, but the anisotropic diffusion layer 460 may be disposed behind the isotropic diffusion layer 430.

Figure 11:
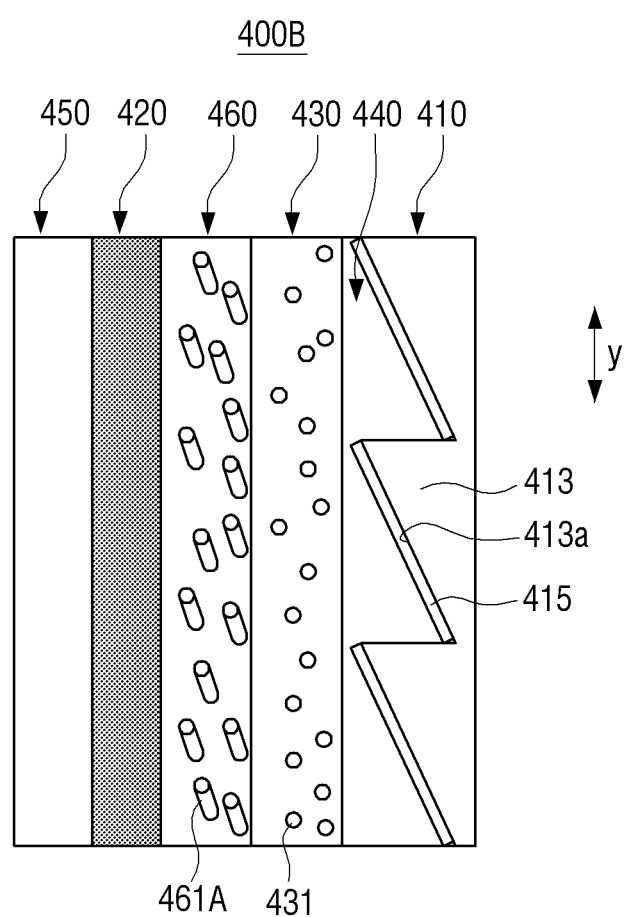
FIG. 11 is a sectional view of an alternative embodiment of the reflection type screen in FIG. 10.

FIG. 11 is a sectional view of an alternative embodiment of the reflection type screen 400A in FIG. 10.

The reflection type screen 400B in FIG. 11 is almost the same as the aforementioned reflection type screen 400A in FIG. 10, but the reflection type screen 400B is distinctive from the reflection type screen 400A in that the micro rod particles 461A of the anisotropic diffusion layer 460A are arranged inclinedly with respect to a vertical direction Y. As an example, an angle of inclination of the micro rod particles 461A may be approximately 30° with respect to the vertical direction Y.

By employing the micro rod particles 461A arranged inclinedly with respect to the vertical direction Y, diffusivity due to the anisotropic diffusion layer 460A can be increased, and thus the screen 400B can provide a more improved horizontal viewing angle.

While exemplary embodiments have been particularly shown and described above, it will be appreciated by those skilled in the art that various changes may be made therein without departing from the principles and spirit of the present inventive concept as defined by the following claims.

What is claimed is:

1. A front reflection screen for a front projection display apparatus, the front reflection screen comprising:
 a reflection layer configured to reflect an incident light including an image light projected from a projector and an external light;
 a tint layer disposed before the reflection layer and including light absorbing particles to block a portion of the incident light; and
 an anisotropic diffusion layer provided on the reflection layer and configured to diffuse the image light reflected from the reflection layer more in a horizontal direction than in a vertical direction by transmitting the image light,
 wherein the anisotropic diffusion layer comprises micro rod particles which diffuse the image light reflected from the reflection layer, and
 wherein the micro rod particles are arranged inclinedly with respect to a vertical direction.

2. The front reflection screen of claim 1, wherein the anisotropic diffusion layer is disposed between the tint layer and the reflection layer.

3. The front reflection screen of claim 1, further comprising an isotropic diffusion layer provided on the reflection layer and configured to diffuse the image light reflected from the reflection layer isotropically.

4. The front reflection screen of claim 3, wherein the isotropic diffusion layer is disposed between the anisotropic diffusion layer and the reflection layer.

5. The front reflection screen of claim 3, wherein the isotropic diffusion layer comprises spherical particles to diffuse the image light reflected from the reflection layer.

6. The front reflection screen of claim 1, wherein the reflection layer comprises a Fresnel type reflection layer.

* * * * *